United States Patent
Sugimoto et al.

(10) Patent No.: US 6,407,159 B2
(45) Date of Patent: Jun. 18, 2002

(54) SILICONE RUBBER COMPOSITION FOR KEYPADS

(75) Inventors: Seiichi Sugimoto; Takahiro Sato, both of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/731,192

(22) Filed: Dec. 6, 2000

(30) Foreign Application Priority Data

Dec. 10, 1999 (JP) .......................................... 11-351404

(51) Int. Cl.$^7$ ................................................ C08K 3/10
(52) U.S. Cl. ...................... 524/729; 524/588; 524/862; 524/866; 524/425
(58) Field of Search ................................ 524/425, 729, 524/588, 862, 866

(56) References Cited

U.S. PATENT DOCUMENTS

| | | | | |
|---|---|---|---|---|
| 4,216,140 A | | 8/1980 | Simizu ................ | 260/45.75 R |
| 4,592,928 A | * | 6/1986 | Antonen ....................... | 427/93 |
| 5,321,058 A | * | 6/1994 | Fuchigami et al. ......... | 523/211 |
| 5,883,184 A | * | 3/1999 | Nagaoka ...................... | 524/788 |
| 6,040,361 A | * | 3/2000 | Fujiki et al. ................. | 523/209 |
| 6,043,309 A | * | 3/2000 | Nakamura et al. .......... | 524/500 |
| 6,114,449 A | * | 9/2000 | Tojo et al. ................... | 525/105 |

FOREIGN PATENT DOCUMENTS

| | | | | |
|---|---|---|---|---|
| CA | 002181492 | 1/1968 | ........... | C08L/83/04 |
| EP | 0483776 A3 | 5/1992 | ........... | C08L/83/04 |
| EP | 0488204 A3 | 6/1992 | ........... | C08L/83/04 |
| EP | 0850995 A3 | 7/1998 | ........... | C08L/83/04 |
| JP | 57-195150 | 11/1982 | | |

\* cited by examiner

*Primary Examiner*—Margaret G. Moore
(74) *Attorney, Agent, or Firm*—James L. De Cesare; Jennifer S. Warren

(57) ABSTRACT

A silicone rubber composition useful for keypads comprising a silicone rubber base produced by mixing under heat (A) a cross-linkable diorganopolysiloxane and (B) 20 to about 250 parts by weight calcium carbonate powder per 100 parts by weight of component (A), and (C) a curing agent consisting of (i) an organic peroxide or (ii) an organohydrogenpolysiloxane and a platinum catalyst in an amount sufficient to effect cure of the composition.

4 Claims, No Drawings

SILICONE RUBBER COMPOSITION FOR KEYPADS

BACKGROUND OF INVENTION

The present invention relates to a silicone rubber useful for keypads. More specifically the present invention relates to a silicone rubber composition that can be used to form silicone rubber possessing superior mechanical durability which can be used to form keypads possessing superior mechanical durability.

Silicone rubber compositions are used for various applications. For example, silicone rubber compositions containing dry process silica powder, wet process silica powder, and other reinforcing silica powders have been used for keypads and other applications requiring mechanical durability. However, the mechanical durability of silicone rubber keypads obtained by curing these compositions has not been entirely satisfactory.

In addition, calcium carbonate powder is a known filler used in silicone rubber compositions. As is disclosed in JP Patent Application Sho 57(1982)-195150, a silicone rubber composition containing 0.1 to about 10 parts by weight of a calcium carbonate powder per 100 parts by weight of a silicone rubber compound can be used to form silicone rubber with dramatically improved characteristics in terms of deterioration due to thermal hysteresis occurring when synthetic rubber and plastics co-exist. However, even with this composition the mechanical durability of keypads of silicone rubber obtained by curing it has not been entirely satisfactory.

The authors of the present invention arrived at the present invention as a result of in-depth investigations aimed at eliminating the above-described problems. Namely, the object of the present invention is to provide a silicone rubber composition that can be used to form silicone rubber possessing superior mechanical durability which is useful as a composition for forming keypads.

SUMMARY OF INVENTION

A silicone rubber composition useful for keypads comprising a silicone rubber base produced by mixing under heat (A) a cross-linkable diorganopolysiloxane and (B) 20 to about 250 parts by weight calcium carbonate powder per 100 parts by weight of component (A), and (C) a curing agent consisting of (i) an organic peroxide or (ii) an organohydrogenpolysiloxane and a platinum catalyst in an amount sufficient to effect cure of the composition.

DESCRIPTION OF INVENTION

The present invention is a silicone rubber composition comprising a silicone rubber base produced by mixing under heat (A) a cross-linkable diorganopolysiloxane and (B) 20 to about 250 parts by weight calcium carbonate powder per 100 parts by weight of component (A), and (C) a curing agent consisting of (i) an organic peroxide or (ii) an organohydrogenpolysiloxane and a platinum catalyst in an amount sufficient to effect cure of the composition.

Detailed explanations will now be first provided regarding the silicone rubber composition of the present invention. The present composition is characterized by using a silicone rubber base obtained by mixing under heat (A) a cross-linkable diorganopolysiloxane and (B) a calcium carbonate powder. The cross-linkable diorganopolysiloxane of component (A), which is a principal component of the present composition, has a substantially linear molecular structure, but part of its molecular chain may be branched. Alkyl groups such as methyl, ethyl, and propyl; alkenyl groups such as vinyl, allyl, and hexenyl; aryl groups such as phenyl and tolyl; aralkyl groups such as benzyl and phenethyl; halogenated alkyl groups such as 3,3,3-trifluoropropyl and 3-chloropropyl, and other substituted or unsubstituted monovalent hydrocarbon groups, and in addition a small amount of hydroxyl groups, are suggested as the silicon-bonded groups contained in component (A). Various diorganopolysiloxanes ranging from low-viscosity liquid diorganopolysiloxanes to high-viscosity gum-like diorganopolysiloxanes can be used as component (A). Due to the excellent mechanical durability of the resultant silicone rubber it is particularly preferable that the viscosity of component (A) at 25° C. should be at least 100 mPa·s. Although there are no limitations concerning component (A) when the present composition is of the free-radical reaction curable type it is preferable component (A) should be a diorganopolysiloxane with an average degree of polymerization of 3,000 to about 10,000. In addition when the present composition is of the hydrosilation reaction curable type, component (A) should preferably be a diorganopolysiloxane having at least two alkenyl groups per molecule.

The calcium carbonate powder of component (B) is a component used for imparting superior mechanical durability to silicone rubber obtained by curing the present composition. Component (B) is exemplified by colloidal calcium carbonate powder, light calcium carbonate (precipitated calcium carbonate) powder, and heavy calcium carbonate powder, with heavy calcium carbonate powders being preferable. The surface of component (B) may be either untreated, or treated with a fatty acid and/or rosin acid. A heavy calcium carbonate powder with a BET specific surface area of not less than 1 m$^2$/g and an average particle size of not more than 10 μm is especially preferable as component (B).

In the present composition, the content of component (B) is 20 to about 250 parts by weight, preferably 50 to about 200 parts by weight, and especially preferably 50 to about 150 parts by weight, per 100 parts by weight of component (A). This is due to the fact that when the content of component (B) is less than the lower limit of the above-mentioned range the mechanical strength of the resultant silicone rubber tends to decrease, and when it exceeds the upper limit of the above-mentioned range the mechanical durability of the resultant silicone rubber tends to decrease.

In the present composition the technique used for preparing a silicone rubber base by mixing under heat the above-described component (A) and component (B) is exemplified by a process in which mixing is carried out at 50 to about 250° C. using well-known mixing equipment, such as a Ross mixer or a kneader-mixer. At such time, one can either mix all of component (B) with component (A) or first mix part of component (B) with component (A), and then mix the remainder of component (B) with the resultant silicone rubber base.

Furthermore, a reinforcing silica powder, such as dry process silica powder, wet process silica powder, and silica powders obtained by treating their surfaces with organosilicon compounds, such as organoalkoxysilanes, organochlorosilanes, organosilazanes, and organosiloxane oligomers may be added to the silicone rubber base in order to improve the mechanical strength of the silicone rubber obtained by curing the present composition. The BET specific surface area of the reinforcing silica powder is preferably at least 50 m$^2$/g. In the present composition the amount of added silica powder is not limited; preferably however it is 1 to about 50 parts by weight per 100 parts by weight of component (A). In addition, when the reinforcing silica powders are added to the silicone rubber base, diorganosiloxane oligomers having both terminal ends of the molecular chain blocked by silanol groups may be added in order to improve the silica powder's dispersibility. The oligomers are exemplified by dimethylsiloxane oligomer having both terminal ends of the molecular chain blocked by silanol groups, methylvinylsiloxane oligomer in which both terminal ends of the molecular chain are blocked with silanol groups, dimethylsiloxane-methylvinylsiloxane co-polymer oligomer having both terminal ends of the molecular chain blocked by silanol groups, and methylphenylsiloxane oligomer having both terminal ends of the molecular chain blocked by silanol groups. The amount, in which the oligomers are added is preferably 1 to about 50 parts by weight per 100 parts by weight of the reinforcing silica powder.

The present composition is prepared by mixing a curing agent consisting of (i) an organic peroxide or (ii) an organohydrogenpolysiloxane and a platinum catalyst with the silicone rubber base comprising components (A) and (B). The curing agent of component (C) is a component used for curing the present composition. When the present composition is of the free-radical reaction curable type the catalyst is (i) an organic peroxide and when the present composition is of the hydrosilation reaction curable type the curing agent consists of (ii) an organohydrogenpolysiloxane and a platinum catalyst.

The organic peroxide of component (i) is exemplified by methylbenzoyl peroxide, dicumyl peroxide, 2,5-dimethyl-2,5-di(t-butylperoxy)hexane, and t-butylperoxyisopropyl monocarbonate, with 2,5-dimethyl-2,5-di(t-butylperoxy)hexane being preferable. In the present composition, the content of component (i) is sufficient for curing the present composition; preferably it is 0.1 to about 10 parts by weight, and especially preferably 0.1 about 5 parts by weight, per 100 parts by weight of component (A).

When the curing component is of a hydrosilation type, the organohydrogenpolysiloxane of component (ii) can have a linear, partially branched linear, branched, or cyclic molecular structure, and its silicon-bonded groups other than hydrogen atoms are exemplified by substituted or unsubstituted monovalent hydrocarbon groups having no aliphatic unsaturation such as methyl, ethyl, propyl, and other alkyl groups; phenyl, tolyl, and other aryl groups; and 3,3,3-trifluoropropyl, 3-chloropropyl, and other halogenated alkyl groups. In the present composition, the content of the organohydrogenpolysiloxane is sufficient for curing the present composition; preferably, it is such that the amount of silicon-bonded hydrogen atoms is 0.5 to about 10 mole per 1 mole of alkenyl groups in component (A).

The platinum catalyst of component (ii) is exemplified by chloroplatinic acid, alcohol solutions of chloroplatinic acid, olefin complexes of platinum, alkenylsiloxane complexes of platinum, carbonyl complexes of platinum, as well as by particulates of acrylic resins, polycarbonate resins, silicone resins, and other thermoplastic resins containing these platinum catalysts. In the present composition, the content of the platinum catalyst is sufficient for curing the present composition and preferably it is such that the content of platinum metal in the present composition is 0.1 to about 1,000 ppm and especially preferably 0.1 to about 500 ppm by weight.

In addition, inorganic fillers such as diatomaceous earth, quartz powder, mica, talc, magnesium oxide, aluminum oxide, aluminum hydroxide, and magnesium hydroxide; pigments, such as carbon black, red iron oxide, and titanium dioxide; heat resistance-imparting agents, such as rare earth oxides, rare earth hydroxides, cerium silanolates, and cerium fatty acid salts; fire resistance-imparting agents, such as fumed titanium dioxide, manganese carbonate, and zinc carbonate; internal mold release agents, such as calcium stearate; and plasticizers may be added to the present composition as optional components.

When the present composition is of the hydrosilation reaction curable type it is particularly preferable to add a trace amount or a small amount of acetylene compounds, hydrazine compounds, triazole compounds, phosphine compounds, mercaptan compounds, or other hydrosilation reaction inhibitor.

The present composition can be prepared by mixing the above-mentioned components (A) through (C) and other optional components using well-known mixing means such as a Ross mixer, a kneader-mixer, etc. It is particularly preferable if the present silicone rubber composition is prepared by mixing the above-mentioned component (C) with a silicone rubber base obtained in advance by mixing under heat the above-mentioned component (A) and component (B). The technique used for mixing under heat the above-mentioned component (A) and component (B) is exemplified by a process in which mixing is carried out at 50 to about 250° C. using well-known mixing equipment such as a Ross mixer or a kneader-mixer.

The present composition can be used to form keypads of silicone rubber by well-known methods such as injection molding. There are no limitations concerning the conditions used for the molding of the present composition; however, it is preferable to carry out heating at 50 about 250° C. over a period of several seconds to several minutes. Because the thus formed keypads of silicone rubber exhibit superior mechanical durability they are particularly suited for use as computer keyboard keypads which are repeatedly subject to extension and compression or push/release impact.

The silicone rubber composition of the present invention will be now explained in detail by referring to application examples. The term "viscosity," as used in the application examples, refers to a value measured at 25° C.

APPLICATION EXAMPLE 1

After mixing 100 parts by weight of dimethylsiloxane-methylvinylsiloxane co-polymer (in which the mole ratio of dimethylsiloxane units to methylvinylsiloxane units was= 99.82:0.18) with an average degree of polymerization (dp) of 7,000 and having both terminal ends of the molecular chain blocked by dimethylvinylsiloxy groups and 100 parts by weight of a heavy calcium carbonate powder with a BET specific surface area of 3 $m^2/g$ and an average particle size of 0.7 $\mu m$ in a kneader mixer, the mixture was mixed at 170° C. for 1 hour to prepare a silicone rubber base. After cooling the base, 0.5 parts by weight of 2,5-dimethyl-2,5-di(t-butylperoxy)hexane was kneaded with 100 parts by weight of the silicone rubber base to produce a silicone rubber composition.

The silicone rubber composition was press molded for 10 minutes at 170° C. under a pressure of 2 MPa to form a silicone rubber sheet with a thickness of 2 mm, which was then placed for 4 hours in a heat-circulation type oven at 200° C. Dumbbell-shaped specimens of Type No. 3 as specified in JIS K 6251 were made from the resultant sheet. The mechanical durability of the silicone rubber was evaluated by subjecting the specimens to five cycles of 100% extension and recovery per second and measuring the number of cycles required to produce rupture. In addition, the hardness of the sheet was measured as Type A durometer as specified in JIS K 6253. The results are shown in Table 1.

APPLICATION EXAMPLE 2

After mixing 100 parts by weight of dimethylsiloxane-methylvinylsiloxane co-polymer (in which the mole ratio of dimethylsiloxane units to methylvinylsiloxane units was=99.82:0.18 mol) with an average dp of 7,000 and having both terminal ends of the molecular chain blocked by dimethylvinylsiloxy groups, 90 parts by weight of a heavy calcium carbonate powder with a BET specific surface area of 3 m$^2$/g and an average particle size of 0.7 μm, 10 parts by weight of a dry process silica powder with a BET specific surface area of 200 m$^2$/g, and 2 parts by weight of dimethylsiloxane oligomer with a viscosity of 40 mPa·s having both terminal ends of the molecular chain blocked by silanol groups in a kneader mixer, the mixture was mixed at 170° C. for 1 hour to prepare a silicone rubber base. After cooling the base, 0.5 parts by weight of 2,5-dimethyl-2,5-di(t-butylperoxy)hexane was mixed with 100 parts by weight of the silicone rubber base to produce a silicone rubber composition.

The silicone rubber composition was press-molded for 10 minutes at 170° C. under a pressure of 2 MPa to form a silicone rubber sheet with a thickness of 2 mm which was then placed for 4 hours in a heat-circulation type oven at 200° C. Dumbbell-shaped specimens of Type No. 3 as specified in JIS K 6251 were made from the resultant sheet. The mechanical durability of the silicone rubber was evaluated in the same manner as in Application Example 1. In addition, the hardness of the sheet was measured as Type A durometer as specified in JIS K 6253. The results are shown in Table 1.

COMPARATIVE EXAMPLE 1

After mixing 100 parts by weight of dimethylsiloxane-methylvinylsiloxane co-polymer (in which the mole ratio of dimethylsiloxane units to methylvinylsiloxane units was=99.82:0.18) with an average dp of 7,000 and having both terminal ends of the molecular chain blocked by dimethylvinylsiloxy groups, 30 parts by weight of a dry process silica powder with a BET specific surface area of 200 m$^2$/g, and 6 parts by weight of dimethylsiloxane oligomer with a viscosity of 40 mPa·s having both terminal ends of the molecular chain blocked by silanol groups in a kneader mixer, the mixture was mixed at 170° C. for 1 hour to prepare a silicone rubber base. After cooling the base, 0.5 parts by weight of 2,5-dimethyl-2,5-di(t-butylperoxy)hexane was mixed with 100 parts by weight of the silicone rubber base to produce a silicone rubber composition.

The silicone rubber composition was press-molded for 10 minutes at 170° C. under a pressure of 2 MPa to form a silicone rubber sheet with a thickness of 2 mm which was then placed for 4 hours in a heat-circulation type oven at 200° C. Dumbbell-shaped specimens of Type No. 3 as specified in JIS K 6251 were made from the resultant sheet. The mechanical durability of the silicone rubber was evaluated in the same manner as in Application Example 1. In addition, the hardness of the sheet was measured as Type A durometer as specified in JIS K 6253. The results are shown in Table 1.

COMPARATIVE EXAMPLE 2

After mixing 100 parts by weight of dimethylsiloxane-methylvinylsiloxane co-polymer (in which the mole ratio of dimethylsiloxane units to methylvinylsiloxane units was=99.82:0.18) with an average dp of 7,000 having both terminal ends of the molecular chain blocked by dimethylvinylsiloxy groups, 30 parts by weight of a wet process silica powder with a BET specific surface area of 200 m$^2$/g, and 3 parts by weight of dimethylsiloxane oligomer with a viscosity of 40 mPa·s having both terminal ends of the molecular chain blocked by silanol groups in a kneader mixer, the mixture was to mixed at 170° C. for 1 hour to prepare a silicone rubber base. After cooling the base, 0.5 parts by weight of 2,5-dimethyl-2,5-di(t-butylperoxy)hexane was mixed with 100 parts by weight of the silicone rubber base to produce a silicone rubber composition.

The silicone rubber composition was press-molded for 10 minutes at 170° C. under a pressure of 2 MPa to form a silicone rubber sheet with a thickness of 2 mm which was then placed for 4 hours in a heat-circulation type oven at 200° C. Dumbbell-shaped specimens of Type No. 3 as specified in JIS K 6251 were made from the resultant sheet. The mechanical durability of the silicone rubber was evaluated in the same manner as in Application Example 1. In addition, the hardness of the sheet was measured as Type A durometer as specified in JIS K 6253. The results are shown in Table 1.

TABLE 1

|  | Application Example 1 | Application Example 2 | Comparative Example 1 | Comparative Example 2 |
|---|---|---|---|---|
| Hardness | 37 | 40 | 36 | 40 |
| Durability (unit: 10,000 cycles) | 1630 | 850 | 240 | 120 |

APPLICATION EXAMPLE 3

After mixing 100 parts by weight of dimethylpolysiloxane with a viscosity of 10,000 mPa·s having both terminal ends of the molecular chain blocked by dimethylvinylsiloxy groups (vinyl group content=0.13 wt %) and 100 parts by weight of a heavy calcium carbonate powder with a BET specific surface area of 3 m$^2$/g and an average particle size of 0.7 μm in a Ross mixer the mixture was mixed at 170° C. for 1 hour to prepare a silicone rubber base. After cooling the base, 1.3 parts by weight of dimethylsiloxane-methylhydrogensiloxane co-polymer with a viscosity of 5 mPa·s having both terminal ends of the molecular chain blocked by trimethylsiloxy groups (content of silicon-bonded hydrogen atoms=0.7 wt %), 1,3-divinyltetramethyldisiloxane complex of platinum (in an amount providing platinum metal in the present composition at 2 ppm), and 0.02 parts by weight of 3,5-dimethyl-1-hexyn-3-ol were mixed with the silicone rubber base to produce a liquid silicone rubber composition.

The silicone rubber composition was press-molded for 5 minutes at 150° C. under a pressure of 2 MPa to form a silicone rubber sheet with a thickness of 2 mm. Dumbbell-shaped specimens of Type No. 3 as specified in JIS K 6251 were made from the resultant sheet. The mechanical durability of the silicone rubber was evaluated in the same manner as in Application Example 1. In addition, the hardness of the sheet was measured as Type A durometer as specified in JIS K 6253. The results are shown in Table 2.

APPLICATION EXAMPLE 4

After mixing 100 parts by weight of dimethylpolysiloxane (vinyl group content=0.13 wt %) with a viscosity of 10,000 mPa·s having both terminal ends of the molecular chain blocked by dimethylvinylsiloxy groups, 90 parts by weight of a heavy calcium carbonate powder with a BET specific surface area of 3 m$^2$/g and an average particle size of 0.7 μm, 10 parts by weight of a wet process silica powder with a BET specific surface area of 200 m$^2$/g, and 1 part by weight of dimethylsiloxane oligomer with a viscosity of 40 mPa·s having both terminal ends of the molecular chain blocked by silanol groups in a Ross mixer, the mixture was mixed at 170° C. for 1 hour to prepare a silicone rubber base. After cooling the base, 1.3 parts by weight of dimethylsiloxane-methylhydrogensiloxane co-polymer with a viscosity of 5 mPa·s having both terminal ends of the molecular chain blocked by trimethylsiloxy groups (content of silicon-bonded hydrogen atoms=0.7 wt %), 1,3-divinyltetramethyldisiloxane complex of platinum (in an amount providing platinum metal in the present composition at 2 ppm), and 0.02 parts by weight of 3,5-dimethyl-1-hexyn-3-ol were mixed with the silicone rubber base to produce a liquid silicone rubber composition.

The silicone rubber composition was press-molded for 5 minutes at 150° C. under a pressure of 2 MPa to form a silicone rubber sheet with a thickness of 2 mm. Dumbbell-shaped specimens of Type No. 3 as specified in JIS K 6251 were made from the resultant sheet. The mechanical durability of the silicone rubber was evaluated in the same manner as in Application Example 1. In addition, the hardness of the sheet was measured as Type A durometer as specified in JIS K 6253. The results are shown in Table 2.

COMPARATIVE EXAMPLE 3

After mixing 100 parts by weight of dimethylpolysiloxane (vinyl group content=0.13 wt %) with a viscosity of 10,000 mPa·s having both terminal ends of the molecular chain blocked by dimethylvinylsiloxy groups, 35 parts by weight of a wet process silica powder with a BET specific surface area of 200 m$^2$/g, and 2 parts by weight of dimethylsiloxane oligomer with a viscosity of 40 mPa·s having both terminal ends of the molecular chain blocked by silanol groups in a Ross mixer, the mixture was to mixed at 170° C. for 1 hour to prepare a silicone rubber base. After cooling the base, 1.3 parts by weight of dimethylsiloxane-methylhydrogensiloxane co-polymer with a viscosity of 5 mPa·s having both terminal ends of the molecular chain blocked by trimethylsiloxy groups (content of silicon-bonded hydrogen atoms=0.7 wt %), 1,3-divinyltetramethyldisiloxane complex of platinum (in an amount providing platinum metal in the present composition at 2 ppm), and 0.02 parts by weight of 3,5-dimethyl-1-hexyn-3-ol were mixed with the silicone rubber base to produce a liquid silicone rubber composition.

The silicone rubber composition was press-molded for 5 minutes at 150° C. under a pressure of 2 MPa to form a silicone rubber sheet with a thickness of 2 mm. Dumbbell-shaped specimens of Type No. 3 as specified in JIS K 6251 were made from the resultant sheet. The mechanical durability of the silicone rubber was evaluated in the same manner as in Application Example 1. In addition, the hardness of the sheet was measured as Type A durometer as specified in JIS K 6253. The results are shown in Table 2.

COMPARATIVE EXAMPLE 4

After mixing 100 parts by weight of dimethylpolysiloxane (vinyl group content=0.13 wt %) with a viscosity of 10,000 mPa·s having both terminal ends of the molecular chain blocked by dimethylvinylsiloxy groups and 300 parts by weight of a heavy calcium carbonate powder with a BET specific surface area of 3 m$^2$/g and an average particle size of 0.7 μm in a Ross mixer, the mixture was mixed at 170° C. for 1 hour to prepare a silicone rubber base. After cooling the base, 1.3 parts by weight of dimethylsiloxane-methylhydrogensiloxane co-polymer with a viscosity of 5 mPa·s having both terminal ends of the molecular chain blocked by trimethylsiloxy groups (content of silicon-bonded hydrogen atoms=0.7 wt %), 1,3-divinyltetramethyldisiloxane complex of platinum (in an amount providing platinum metal in the present composition at 2 ppm), and 0.02 parts by weight of 3,5-dimethyl-1-hexyn-3-ol were mixed with the silicone rubber base to produce a liquid silicone rubber composition.

The silicone rubber composition was press-molded for 5 minutes at 150° C. under a pressure of 2 MPa to form a silicone rubber sheet with a thickness of 2 mm. Dumbbell-shaped specimens of Type No. 3 as specified in JIS K 6251 were made from the resultant sheet. The mechanical durability of the silicone rubber was evaluated in the same manner as in Application Example 1. In addition, the hardness of the sheet was measured as Type A durometer as specified in JIS K 6253. The results are shown in Table 2.

TABLE 2

|  | Application Example 3 | Application Example 4 | Comparative Example 3 | Comparative Example 4 |
| --- | --- | --- | --- | --- |
| Hardness | 37 | 40 | 36 | 46 |
| Durability (unit: 10,000 cycles) | 2200 | 960 | 390 | 20 |

We claim:

1. A silicone rubber keypad comprising a keypad formed by curing a silicone rubber composition, the silicone rubber composition including a silicone rubber base, the silicone rubber base being produced by mixing and heating:
   (A) a crosslinkable diorganopolysiloxane;
   (B) 20–250 parts by weight of a calcium carbonate powder per 100 parts by weight of component (A); and
   (C) a curing agent, the curing agent consisting of (i) an organic peroxide, or (ii) an organohydrogen polysiloxane and a platinum catalyst, the curing agent being present in an amount sufficient to effect curing of the silicone rubber composition; with the provisos that:
      (a) component (B) is a heavy calcium carbonate powder having a BET specific surface area of not less than 1 m$^2$/g, the heavy calcium carbonate powder has an average particle size of not more than 10 μm; and
      (b) the silicone rubber composition is formed by first mixing and heating components (A) and (B) at 50–250° C., and then adding component (C) to the heated mixture of components (A) and (B) after components (A) and (B) have been mixed and heated.

2. The keypad according to claim 1 where the crosslinkable diorganopolysiloxane (A) has an average degree of polymerization of 3,000–10,000.

3. The keypad according to claim 2 further comprising a reinforcing silica powder.

4. A silicone rubber comprising a rubber formed by curing a silicone rubber composition, the silicone rubber composition including a silicone rubber base, the silicone rubber base being produced by mixing and heating:

(A) a crosslinkable diorganopolysiloxane;

(B) 20–250 parts by weight of a calcium carbonate powder per 100 parts by weight of component (A); and (C) a curing agent, the curing agent consisting of (i) an organic peroxide, or (ii) an organohydrogen polysiloxane and a platinum catalyst, the curing agent being present in an amount sufficient to effect curing of the silicone rubber composition; with the provisos that:

(a) component (B) is a heavy calcium carbonate powder having a BET specific surface area of not less than 1 $m^2/g$, the heavy calcium carbonate powder has an average particle size of not more than 10 $\mu$m; and (b) the silicone rubber composition is formed by first mixing and heating components (A) and (B) at 50–250° C., and then adding component (C) to the heated mixture of components (A) and (B) after components (A) and (B) have been mixed and heated.

* * * * *